July 3, 1951 — W. H. KORN — 2,559,041

LUBRICATING DEVICE

Filed April 11, 1946 — 2 Sheets-Sheet 1

INVENTOR.
Waldemar H. Korn
BY
Evans & McCoy
ATTORNEYS

July 3, 1951 W. H. KORN 2,559,041
LUBRICATING DEVICE
Filed April 11, 1946 2 Sheets-Sheet 2

INVENTOR.
Waldemar H. Korn
BY
Evans + McCoy
ATTORNEYS

Patented July 3, 1951

2,559,041

UNITED STATES PATENT OFFICE 2,559,041

LUBRICATING DEVICE

Waldemar H. Korn, Davenport, Iowa

Application April 11, 1946, Serial No. 661,416

14 Claims. (Cl. 308—88)

This invention pertains to lubricating devices and in particular to a device adapted for the lubrication of the journals of railway vehicles.

It is known that the use of a lubricating pad for lubricating railway car journals is highly advantageous in that it obviates many problems arising from the use of journal boxes stuffed with waste and saturated with lubricant. A waste stuffed journal box is subject to the disadvantages of the waste compacted through vibration or causing what is known as waste grabs, that is, where small particles of waste adhere to and rotate with the journal, becoming lodged under the bearing. All of these difficulties lead to a breakdown in the proper supply of lubricant to the journal and in many instances to hot boxes and their subsequent delays in rail movements.

However, in using lubricating pads to lubricate journals, it is necessary that the pads be resiliently urged into contact with the journal. This force causes a compression of the lubricating pad and in a short time the surface of the pad has become glazed from its engagement with the journal and the lubricant will not be properly fed through the glazed surface of the pad to the journal.

Accordingly, it is an object of the present invention to provide a lubricating device employing lubricating pads in which the compression of the pad is limited so that it will be highly resistant to glazing.

Another object is to provide a lubricating device utilizing a compressible lubricating body or pad in which the compression of the pad is limited so that the pad is resistant to wear and will have greatly increased life.

A further object is to provide a journal lubricating device which has relatively few parts and is easy to install and maintain.

Other objects and advantages will become apparent from the following description of the invention.

In the drawings illlustrating the present invention,

Figure 1:
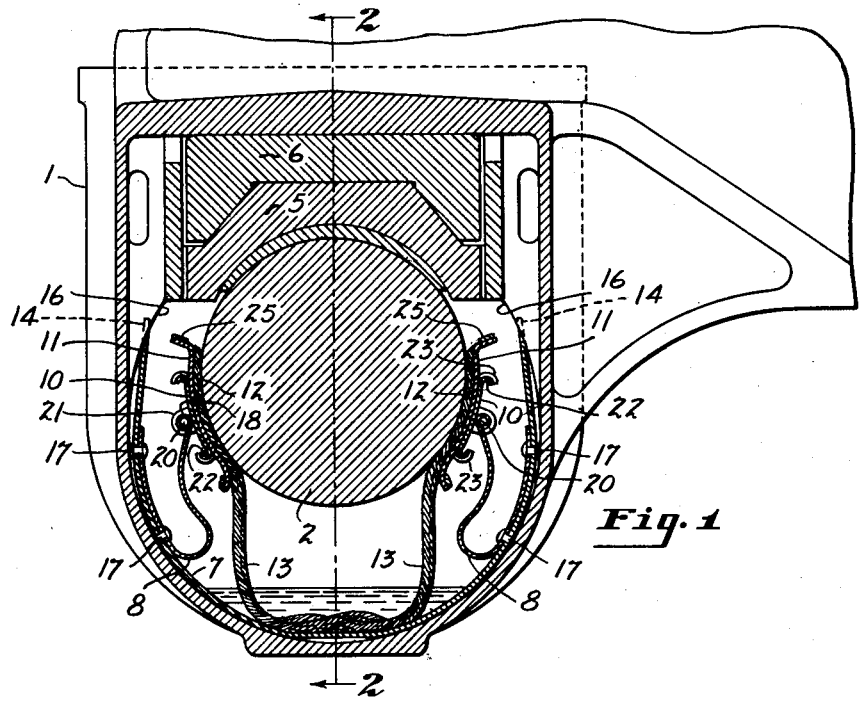
Figure 1 is a fragmentary end elevational view of a railway car journal and journal box illustrating a lubricating device embodying the present invention.

In the drawings, numeral 1 indicates a conventional journal box having received therein a journal 2 of a railway car axle 3. In the conventional manner the journal box 1 is provided with an opening 4 adapted to be sealed by any suitable closure member such as a spring pressed door. Disposed above the journal 2 is a conventional crown bearing or brass 5 which is held in place with respect to the journal by a bearing wedge 6 which wedges the bearing between the roof of the journal box 1 and the journal 2. A suitable lubricant may be poured through the opening 4 in the journal box into a reservoir provided in the bottom portion of the journal box.

Briefly, the lubricating device of the present invention comprises a U-shaped support or base member 7, a pair of resilient arms 8 carried by the base member, support members 10 pivotally mounted to the free ends of the arms 8 and backing members 11 slidably carried on the support members 10 the members 10 are each dished or flared at their ends as indicated at 10a (see Fig. 4) for a purpose to be hereinafter described. A compressible lubricating pad or body 12 is secured to the backing member 11 and has depending therefrom a plurality of wick elements 13.

Figure 4:
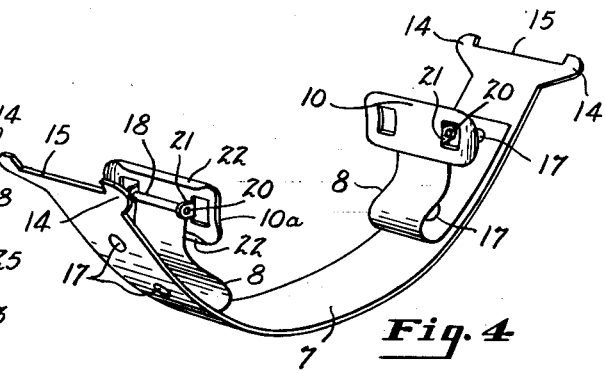
Fig. 4 is a perspective view of the device with the lubricating pads removed to illustrate how the device may be installed and the removable pads attached to the balance of the device.

The U-shaped base member 7 is preferably a flat leaf spring which may be flexed for insertion through the opening 4 in the journal box. Each end of the base member 7 may be provided with portions which interfit with portions of the journal box to prevent substantial movement of the base member after it is properly positioned in a journal box. As illustrated in Figs. 4 and 1, the support member 7 may be provided with enlarged end portions 14 having a recess 15 cut therein so that the enlarged end portions 14 will embrace ribs 16 in the interior wall of the journal box.

The resilient arms 8 may also be formed of a flat leaf spring material and are substantially U-shaped. One side of the U may be fastened to the base member 7 such as by riveting or spot welding, as indicated by the numeral 17 in Figs. 1 and 4. The opposite sides of the U-shaped arms 8 extend upwardly from the bottom of the journal box in the direction of the journal and terminate in rolled portions 18 which embrace and hold for rotation therein pivot pins 20. It will be noted that the extended reversely directed portions of the U-shaped arms 8 are connected to the portions which are secured to the arms of the supporting member 7 by curved portions which function as spring hinges, the hinge axis varying to meet movement of the free arm portion to and from normal position. Ears 21 which may be struck from the surface of the support members 10 are also mounted for rotation about the pivot pins 20, thus providing a pivotal connection between the support members 10 and the resilient arms 8.

The support members 10 may have their top and bottom edges rolled to provide a track 22 to receive and hold similar curved portions 23 of the backing members 11. These curved portions 23 may be formed by striking tongues from the backing surface and curling them to an upstanding position where they may embrace and interfit with the rolled edges 22 of the support members 10.

Figure 8:
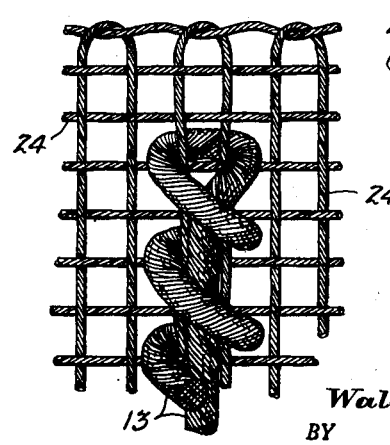
Fig. 8 is an enlarged view showing details of the fabrication of the lubricating pad.

The backing members 11 are preferably arcuate in cross section so that the lubricating body secured to the backing member will have a layer area in engagement with the journal to insure adequate lubrication. A fabric or fiber mesh 24 is mounted to the backing member 11. The compressible body 12 which provides the lubrication may be formed by a plurality of wick elements 13 interwoven through the mesh 24, as is shown in enlarged size and with a single wick element in Fig. 8. One method of interweaving is indicated in which one strand of a wick element is disposed along one series of strands of the fabric mesh while the other strand is interwoven periodically around both series of strands comprising the mesh and the first strand. This provides two free ends of the wick element which are permitted to depend from the lubricating body downwardly to the region of the base member 7 where they are disposed beneath the level of the lubricant in the reservoir the interwoven arrangement of the wicks 13, as well as their securement to the backing members 11, insures against disintegration and drawing of threads upwardly between the bearing and the journal which, if permitted, would result in formation of "wipers" which remove or destroy the oil film and lead to impairment or destruction of the bearings.

Figure 5:
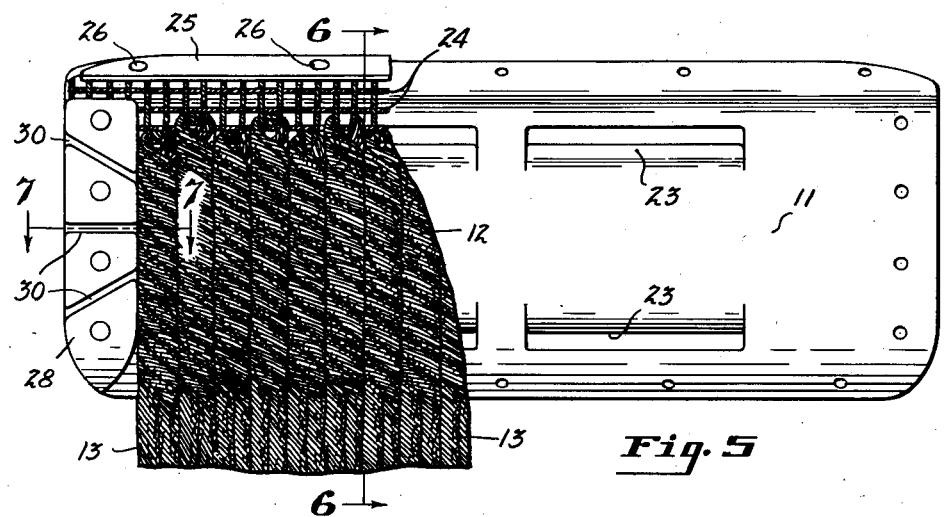
Fig. 5 is an enlarged elevational view with parts broken away to illustrate the construction of the compressible lubricating pad or body.

The capillary action of the wick elements draws lubricant from the reservoir upwardly into the compressible body or pad 12 which is in engagement with the journal. The mesh and compressible body of the lubricating pad are held to the backing member 11 by retaining strips 25 which are disposed along the top and bottom edges of the backing member 11 and may be fastened thereto by spot welding or by countersunk rivets, as indicated by the numeral 26 in Fig. 5.

Figure 6:
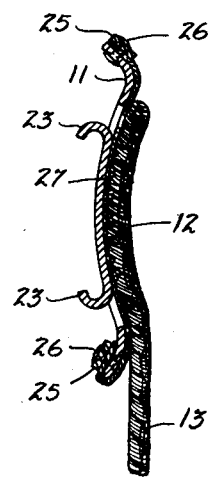
Fig. 6 is an end elevational view showing a cross section of the pad and taken substantially on line 6—6 of Fig. 5.

If desired, the fabric and compressible body may be held to the backing member 11 throughout the entire area by a coat of suitable cement or adhesive indicated by the numeral 27 in Fig. 6. This insures that the compressible pad will assume an arcuate shape corresponding to the backing member 11 and the surface of the journal 2.

Figure 7:
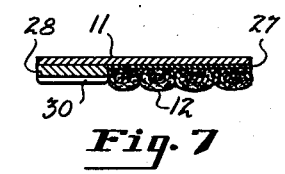
Fig. 7 is an enlarged fragmentary cross sectional view taken substantially on line 7—7 of Fig. 5, illustrating the means for limiting compression of the lubricating pad or body.

The side edges of the compressible pad are held to the backing member 11 by spacer elements 28 which may also be secured to the backing member by spot welding or by the use of countersunk rivets. The face of the spacer elements 28 which adjoins the journal may be provided with oil conducting grooves 30 to direct oil outwardly from the pad to the portions of the journal adjacent the ends of the pad. It will be noted from examination of Fig. 7 that the spacer elements have a depth less than the depth of the compressible body portion to limit the compression of the body portion. In this manner glazing of the compressible body portion is decreased to a minimum.

In operation the capillary action of the wick elements draws lubricant upwardly into the compressible body portion, and since the spacer elements limit the compression of the lubricating body, the individual interwoven wick elements may remain substantially uncompressed and saturated with lubricant which is fed to the journal due to the light contact between the lubricating body and the journal. The leaf spring construction of the arms 8 urges the lubricating body toward the journal and maintains a yieldable light engagement between the lubricating body and the journal. Since the backing members 11 are free to slide longitudinally of the journal along the support members 10, the lubricating body may have longitudinal movement along the journal. This movement is also highly advantageous in that it permits ease of replacement of the lubricating body after long use. It is only necessary to reach through the opening 4 of the journal box 1 and flex the arm 8 so that the lubricating body portion is held out of engagement with the journal. The backing member 11 and lubricating body may be readily withdrawn for inspection and replacement by movement longitudinally of the journal.

Figure 2:
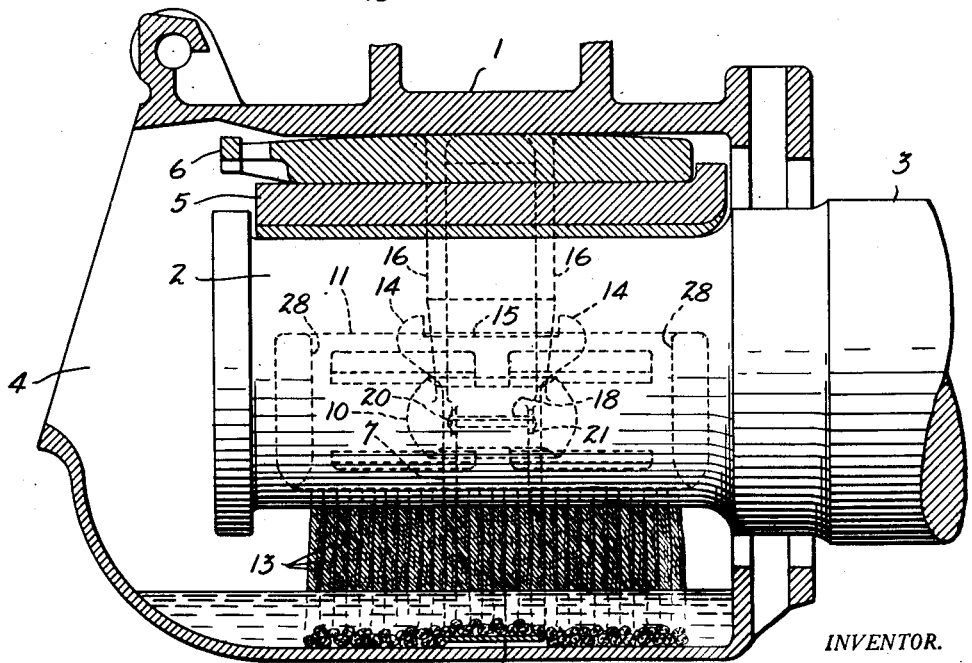
Fig. 2 is a sectional elevational view taken substantially on line 2—2 of Fig. 1.
Figure 3:
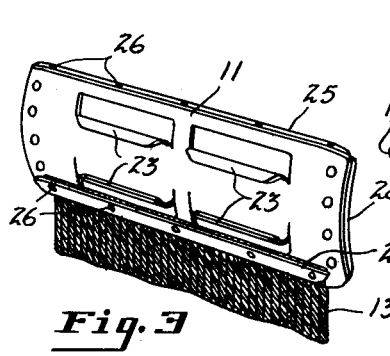
Fig. 3 is a perspective view of the compressible lubricating pad portion of the device.

My device is readily installed in present day journal boxes by compressing the base or support member 7 to bring the arms sufficiently close together to permit insertion into the journal box in a generally horizontal position until the base portion clears the lower lip of the aperture or entrance to the journal box, after which the member 7 may be gradually rotated into position beneath the axle, the proper position being defined and determined by engagement of the notched ends 14 which are engaged with the rib 16 of the journal box, as illustrated in Fig. 2.

This may generally be done readily, manually, but if there should be obstruction from a rib 16, it is only necessary to use the flat blade of the conventional journal box packing-tool to release the obstructed support end and move it into locking engagement in proper position. This interengagement accurately positions the support in a central location relative to the journal box while preventing displacement or substantial shifting of the support member. Before this insertion, the pads and backing members 11 are removed from the device. After positioning of the supporting member 7, each pad is slid into engagement with its supporting member 10 wherein the grooved lugs 23 slidably engage the top and bottom of the members 10. Axial movement of the pads is permitted during similar movement of the contacted journal, but the shoulders of the journal prevent disassembly when in operating position and, in general, the pads will not move axially until contacted by one or the other shoulder of the axle, thus insuring lubrication over the entire surface of the journal. The dished ends 10a of the supporting members 10 permit easy entrance of the pads and backing members 11 between them and the axle when assembling the device in position.

The foregoing description is not intended to limit the scope of the invention.

What I claim is:

1. A lubricating device comprising a backing member having longitudinally extending top and bottom edges, an open meshed netting secured across one face of said backing member, wick members of absorptive material engaging said mesh and interwoven across the face thereof to form a pad, said pad being provided with extended wick portions depending beyond said longitudinally extending bottom edge of said backing member.

2. A lubricating device comprising a backing member, an open meshed netting secured across the face thereof and wicks of absorptive material interwoven across and engaging said netting in sufficient amount to form a continuous pad thereacross extending longitudinally between the upper and lower edges thereof, said pad being provided with extended wick portions depending beyond the longitudinally extending lower edge and means to secure said netting to said backing member.

3. A lubricating device comprising a backing member, a pad comprising interwoven strands of absorptive material across one face of said backing member with wicks freely depending therefrom, means to secure said pad to said backing member adjacent the ends of the latter, said last named means comprising strips overlying portions of said pad and secured to said backing member, said strips being each provided with a passage for flow of oil.

4. A lubricating device comprising a backing member, a pad comprising interwoven wicks of absorptive material across one face of said backing member with wicks freely depending therefrom, means to secure said pad to said backing member adjacent the ends of the latter, said last named means comprising strips overlying portions of said pad and secured to said backing member, said strips being each provided with a passage for flow of oil, said securing strips being of less thickness than said pad.

5. A lubricating device comprising an arcuate backing member, the top and bottom portions thereof being outwardly flared, a pad extending across one face of said backing member and means to secure said pad to said backing member comprising longitudinal strips located adjacent the top and bottom edges of said backing member and secured thereto.

6. A lubricating device for insertion in a journal box comprising a main supporting member, said member being provided with a curved base portion and extended flexible arms, said arms being provided with means to engage portions of a journal box, resilient arms secured to said supporting member, each formed with a reversely-bent, free portion, lubricating pads pivotally mounted upon the free portions of said resilient arms.

7. A lubricating device for insertion in a journal box comprising a main supporting member, said member being provided with a curved base portion and extended flexible arms, resilient arms secured to said arms of said supporting member, each being formed with a reversely-bent, free portion, support members pivotally mounted on said free portions, backing members, each provided with a pad and extended wicks, said backing members each being provided with means for sliding engagement with a support member.

8. A lubricating device comprising a backing member and a mesh surface secured to said backing member adjacent to the longitudinally extending top and bottom edges thereof and a compressible body formed of a plurality of wick elements interwoven with said mesh surface intermediate its top and bottom longitudinal edges, said wick elements having extended portions depending therefrom beyond the bottom edges of said mesh surface and of said backing member.

9. A lubricating body comprising a substantially longitudinally extending rectangular open mesh netting, a continuous body formed on substantially one face of said mesh netting comprising a plurality of wicks of absorptive material, the wicks having one end portion extending from beyond one longitudinally extending edge of said mesh netting across the longitudinally extending netting strands and parallel to the vertically extending netting strands to adjacent the top longitudinal edge of said netting, then extending through said netting and curled back about said first portion of said wick and about some of the vertically extending netting strands and then beyond the lower longitudinally extending edge of the netting to provide a depending wick portion.

10. A lubricating device comprising an arcuate backing member having a concave face, said backing member being provided with an outwardly flared top and bottom portions, said top portion being an oil restraining portion, a pad of absorptive material extending across the concave face thereof intermediate said outwardly flared top and bottom portions, said pad being provided with absorbent means depending along its bottom edge downwardly beyond the outwardly flared bottom portion of said backing member.

11. A lubricating device for insertion in a journal box comprising a resilient main supporting base member, said supporting base member being provided with a curved base portion and oppositely extending yieldable arms arranged to yieldably contact with the bottom and sides of the journal box to position said supporting base member and retain it against substantial movement, inwardly extending looped flexible arms provided on said base member arms adjacent the ends of said base member arms, and lubricating means carried by said inwardly extending flexible arms.

12. A lubricating device for insertion in a journal box comprising in combination a supporting member having a base portion for seating in said box and arm portions for engaging lugs in said box, a resilient arm projecting from said support and having a reversely bent portion with a free end, pad supporting means carried by said free end, a backing plate mounted on the pad supporting means, a pad of absorbent material secured to said plate and provided with a depending absorbent means, said backing plate being provided with means removably to engage said pad supporting means of said resilient arm.

13. A lubricating device for insertion in a journal box comprising in combination a supporting member having a base portion for seating in said box and arm portions for engaging lugs in said box, a resilient arm projecting from said support and having a reversely bent portion with a free end, pad supporting means carried by said free end, a backing plate mounted on said pad supporting means, a pad of absorbent material secured to said plate and provided with a depending absorbent means, said backing plate being provided with means removably to engage said pad supporting means of said resilient arm, and means to limit the compression of said pad when pressed against a surface to be lubricated.

14. A lubricating device for insertion in a journal box comprising in combination a supporting member having a base portion for seating in said box and arm portions for engaging lugs in said box, a resilient arm projecting from said support and having a reversely bent portion with a free end, pad supporting means carried by said free end, a backing plate mounted on said pad supporting means, a pad of absorbent material secured to said plate and provided with a depending absorbent means, said backing plate being provided with means slidably and pivotally engageable with said pad supporting means of said resilient arm.

WALDEMAR H. KORN.

REFERENCES CITED

The following references are of record in the file of this patent:

UNITED STATES PATENTS

| Number | Name | Date |
|---|---|---|
| 714,272 | Armstrong | Nov. 25, 1902 |
| 821,203 | Tibbett | May 22, 1906 |
| 2,009,323 | Penniman | July 23, 1935 |
| 2,021,715 | Cooper | Nov. 19, 1935 |
| 2,095,257 | Kendall | Oct. 12, 1937 |
| 2,132,420 | Jones | Oct. 11, 1938 |
| 2,156,377 | DeMatteo | May 2, 1939 |
| 2,218,315 | Jones | Oct. 15, 1940 |

FOREIGN PATENTS

| Number | Country | Date |
|---|---|---|
| 4,559 | Great Britain | 1880 |
| 12,292 | Great Britain | 1909 |
| 166,643 | Switzerland | Mar. 16, 1934 |